United States Patent
Openiano

[19]

[11] Patent Number: 5,836,185
[45] Date of Patent: *Nov. 17, 1998

[54] TELESCOPING VEHICLE ANTI-THEFT DEVICE SEPARATELY SIMULTANEOUSLY LOCKING TO THE VEHICLE'S STEERING WHEEL AT EACH OF TWO LOCATIONS

[76] Inventor: Renato M. Openiano, 934 Fuchsia La., San Diego, Calif. 92154

[ * ] Notice: The term of this patent shall not extend beyond the expiration date of Pat. No. 5,636,538.

[21] Appl. No.: 897,811

[22] Filed: Jul. 21, 1997

Related U.S. Application Data

[63] Continuation of Ser. No. 647,242, May 9, 1996, abandoned, which is a continuation-in-part of Ser. No. 514,238, Aug. 11, 1995, Pat. No. 5,636,538.

[51] Int. Cl.⁶ .................................................. B60R 25/02
[52] U.S. Cl. ................................. 70/209; 70/237; 70/226
[58] Field of Search ........................... 70/209, 211, 212, 70/226, 225, 237, 238

[56] References Cited

U.S. PATENT DOCUMENTS

| | | | |
|---|---|---|---|
| 1,411,728 | 4/1922 | Hogg | 70/200 |
| 3,138,038 | 6/1964 | Carson | 70/211 |
| 3,245,239 | 4/1966 | Zaioener | 70/237 |
| 4,103,524 | 8/1978 | Mitchell et al. | 70/237 |
| 4,747,279 | 5/1988 | Solow | 70/238 |
| 5,052,201 | 10/1991 | Liou | 70/209 |
| 5,138,853 | 8/1992 | Chen | 70/209 |
| 5,142,889 | 9/1992 | Liu | 70/209 |
| 5,144,822 | 9/1992 | Jan et al. | 70/209 |
| 5,197,308 | 3/1993 | Pazik | 70/209 |
| 5,199,284 | 4/1993 | Lin | 70/209 |
| 5,257,518 | 11/1993 | Hsieh | 70/209 |
| 5,267,458 | 12/1993 | Heh | 70/209 |
| 5,297,406 | 3/1994 | Lin | 70/209 |
| 5,299,438 | 4/1994 | Chen | 70/209 |
| 5,491,990 | 2/1996 | Von-Lambert | 70/226 |
| 5,566,561 | 10/1996 | Hucknall | 70/209 |
| 5,678,433 | 10/1997 | Riccitelli | 70/209 |

FOREIGN PATENT DOCUMENTS

| | | | |
|---|---|---|---|
| 925217 | 8/1947 | France | 70/238 |
| 2639591 | 6/1990 | France | 70/237 |

Primary Examiner—Darnell M. Boucher
Attorney, Agent, or Firm—Fuess & Davidenas

[57] ABSTRACT

Two parts telescope so as to selectively engage the steering wheel at a portion of its rim. A third part independently telescopes relative to the first two parts so as to span a remaining portion of the diameter of the steering wheel, and so as engage the rim of the wheel at a point opposite to the portion where are located the first and second parts. One single key lock suffices to lock all telescoping parts in position, selectively engaging or releasing the device from the steering wheel at two points. The impediment presented by the locked device to turning the steering wheel is not subject to being defeated merely by cutting through either the steering wheel, or the device itself, at any single location.

6 Claims, 3 Drawing Sheets

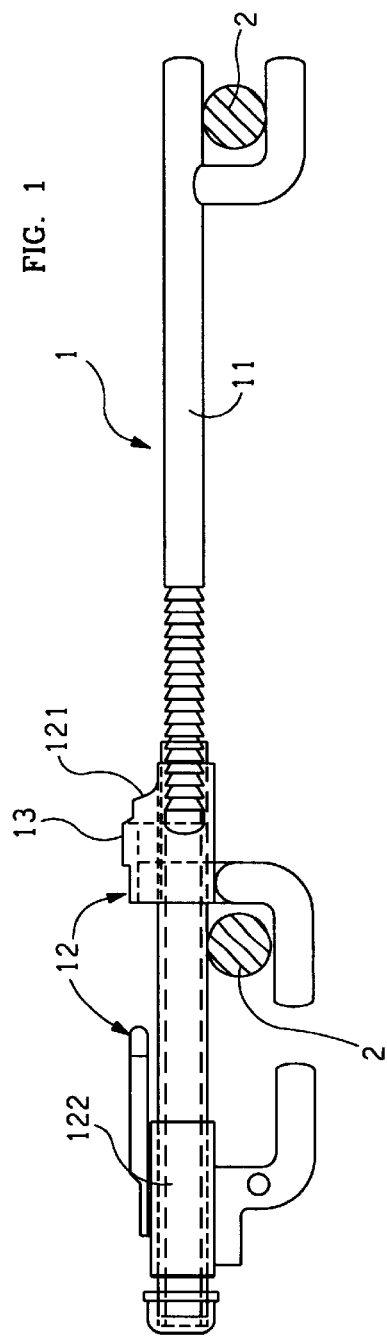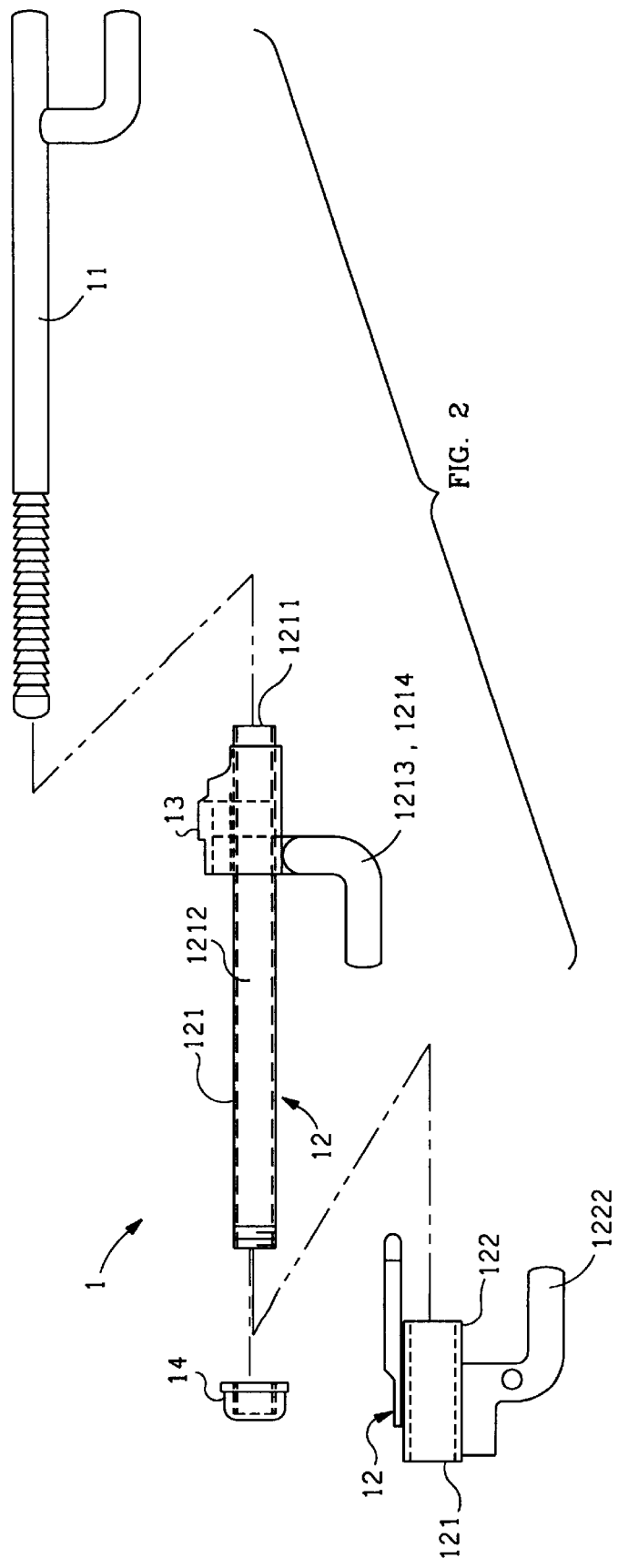

TELESCOPING VEHICLE ANTI-THEFT DEVICE SEPARATELY SIMULTANEOUSLY LOCKING TO THE VEHICLE'S STEERING WHEEL AT EACH OF TWO LOCATIONS

REFERENCE TO RELATED PATENT APPLICATIONS

The present application is a file wrapper continuation of U.S. patent application Ser. No. 08/647,242 filed May 9, 1996, now abandoned; which application is itself a continuation-in-part of U.S. patent application Ser. No. 08/514,238 filed Aug. 11, 1995, now issued Jun. 10, 1997 as U.S. Pat. No. 5,636,538 for a VEHICLE ANTI-THEFT DEVICE SEPARATELY SIMULTANEOUSLY LOCKED TO THE VEHICLE'S STEERING WHEEL AT EACH OF TWO LOCATIONS to the selfsame inventor of the present application.

BACKGROUND OF THE INVENTION

1. Field of the Invention

The present invention generally concerns vehicular steering wheel security locks used to deter theft.

The present invention particularly concerns steering wheel security locks that, by their manner of attachment to a steering wheel, are not readily defeated by cutting either the steering wheel, or the lock, at but a single location.

2. Description of the Prior Art

2.1 Prior Art of General Relevance

U.S. Pat. No. 5,052,201 to Jaieter Liou for an AUTOMOBILE STEERING WHEEL LOCK concerns an automobile steering wheel lock comprising a racheted stick with a hooked end and a lock block with a stick hole to receive the stick. The lock block is slidable along the stick. The lock block comprises a pawl which is biased by a spring to engage the ratchet of the stick so that when the hook of stick is hooked on a spoke of a steering wheel then the lock block is movable toward the hooked end of stick to secure it on the steering wheel, and is not able to withdraw owing to the engagement of the pawl with the ratchet. A de-engaging device is provided to release the engagement of the pawl with the ratchet so as to remove the lock off the steering wheel.

U.S. Pat. No. 5,142,889 for an AUTOMOBILE STEERING LOCK to Steve Liu discloses an anti-theft device for attachment to a steering wheel of an automobile comprising an elongated body member having a passageway extending along an axis therein, a first hook secured to the body member for engagement with a portion of the steering wheel, an elongated tubular member adapted to move in telescopic fashion in the passageway of the body member along the axis, a second hook secured to the tubular member for engaging the inside portion of the steering wheel diametrically opposed to the first hook, a rod member adapted to move in telescopic fashion within the tubular member for preventing the steering wheel from complete rotation, and a lock associated with the body member. The lock engages the tubular member and rod member within the passageway, permitting the tubular member and the rod member to extend with respect to the body member and to be locked at any of a number of positions.

U.S. Pat. No. 5,197,308 for a STEERING WHEEL SECURITY DEVICE to John A. Pazik concerns an improved vehicle security device of the steering lock type for use on the steering wheel of a moveable vehicle, such as an automobile, truck, boat or the like. The steering lock device is of a type having two separable bar sections locked together to form an elongated locking bar that extends beyond the rim of the steering wheel so as to prevent the steering wheel from being significantly turned. The device has an improved attachment for preventing the device from being lifted off the steering wheel. In one embodiment, a double forked end is provided on each bar section formed by two downward extending forked tines that extend beneath an overlying section of the bar section. The double forks are located in position so as to engage against the rim of the steering wheel, each fork being located on opposite sides of a reinforcing member that is part of the steering wheel. In another embodiment, radially inner directed forked sections are used on the radially inner ends of the bar sections to surround the central hub of the steering wheel beneath the reinforcing member.

U.S. Pat. No. 5,199,284 for a LOCK DEVICE FOR A STEERING WHEEL IN AN AUTOMOBILE to Chuan-Chuan Lin, et al. concerns a lock device for locking a steering wheel in an automobile which lock device has a retaining plate unit. The retaining piece unit includes an elongated plate body covering two diametrically opposed portions of the rim of the steering wheel, a fixed pawl member fixed on the plate body, and a movable pawl member mounted axially movably on the plate body. A blocking rod is mounted axially movably on the plate body. A locking mechanism locks the blocking rod releasably in one of several first selected positions on the retaining plate unit so as to extend a portion of the blocking rod from an end of the retaining plate unit. A key plug unit is disposed on the retaining plate unit so as to lock the movable pawl member releasably in one of several selected second positions on the retaining plate unit.

U.S. Pat. No. 5,239,849 for an AUTOMOBILE AND PROPERTY ANTI-THEFT APPARATUS shows a protective device having a dual purpose to both lock a steering wheel and provide a protective enclosure for small articles.

Similarly, U.S. Pat. Nos. 5,253,497 for a MULTIFUNCTION AUTOMOBILE STEERING LOCK to Hsieh, and 5,259,222 for a SPECIAL FUNCTION OF LOCKING SYSTEM WITH THEFT-PROTECT FOR CAR EQUIPMENTS to Jang, both show steering locks having a complex structure in order to perform more than one function.

U.S. Pat. No. 5,257,518 for a LOCKING DEVICE FOR LOCKING A STEERING WHEEL OF A CAR to Chung-Fang Hsieh concerns a locking device includes a first lock body that has a front end with a first clamp member projecting forward, a rear end opposite to the front end, and a blind bore extending longitudinally from the front to the rear end. An elongated rod with a number of annular grooves formed along the length is retractably received in the blind bore. A second lock body has (i) a front end with a second clamp member projecting forward and (ii) a rear end opposite to the front end. The rear end of the second lock body is pivoted to the rear end of the first lock body between a first position where the second clamp is distal from the first clamp and a second position where the second clamp cooperates with the first clamp to define an enclosed clamp. A key-operated cylinder lock including a contained plug member retains the elongated rod at a predetermined position and disengages the second lock body from the first lock body at the second position. A rotation of the plug member in the cylinder lock permits the disengagement of the elongated rod from the predetermined position in the blind bore and disengagement of the second lock body from the first lock body.

U.S. Pat. No. 5,284,037 for an AUTOMOBILE STEERING LOCK to Chen, et. al., shows a steering wheel lock having multiple sections. The security device of the present invention will also be seen to employ multiple sections.

U.S. Pat. No. 5,299,438 for an AUTOMOBILE STEERING LOCK to Chen, et. al., describes a steering wheel lock that is operative to grab a single rim portion of a steering wheel between a single hook and a double hook. A like mechanism will be seen to be used as a portion of the security device of the present invention. In particular, the steering wheel lock of Chen, et al. has (i) a movable tubular member fitting movably around an elongate rod member to adjust the distance in relation to the rod member so as to catch hold of a portion of a steering wheel with a double hook, (ii) a stop plate provided at one end of the rod member, and (iii) a bent plate provided under the tubular member. The tubular member is locked at an adjusted position by means of a lock including a steel ball engaging one of annular grooves provided on a portion of the rod member.

U.S. Pat. No. 5,375,441, for a LOCKING DEVICE FOR STEERING WHEEL to Liou shows a device for locking a rim portion of a steering wheel.

U.S. Pat. No. 5,457,972 for an ANTI-THEFT DEVICE FOR AUTOMOBILE to Tzung-I Lo concerns an anti-theft device for locking up the steering wheel of an automobile. The device has a locking rod, of which one end is welded to the center of a symmetrical locking hook, while the other end thereof is inserted into a lock rod groove of a casing portion. The casing portion has a locking assembly to prevent the locking rod from moving unintentionally. One side of the casing portion is fastened with a L-shaped locking plate facing the locking hook. Symmetrical locking hooks are used to hold the spoke of a steering wheel. The L-shaped locking plate can be moved by pushing the casing portion until it holds the grip wheel of a steering wheel so as to prevent a car from being stolen.

2.2 Prior Art of Specific Relevance

U.S. Pat. No. 5,138,853 for an ANTITHEFT LOCK FOR A VEHICLE to Ruei-Mei Chen concerns an antitheft steering wheel lock for securing to a steering wheel from the inside thereof. The lock includes a rod member surrounded with a sleeve, two groove ends extending beyond the sleeve and two hooks secured to two ends of the sleeve that, respectively, form two openings in an opposed direction. A U-shaped member and a fork-shaped member are provided to sleeve onto the two groove ends and the two hooks, respectively, for securing the open ends of the rod and for preventing removal of the lock, thus guarding the vehicle.

The lock of Chen thus has three major members—(i) a sleeved central rod with two hooks, (ii) a U-shaped member, and (iii) a fork-shaped member—thus interconnect to secure a rim of the steering wheel at two locations. The security device of o of the present invention will also be seen to have three major members which serve to lock a steering wheel and each of two locations—as does Chen. The three major members or the device of the present invention will be seen, however, to be cooperatively interactive in a manner that the three major members of Chen are not.

U.S. Pat. No. 5,297,406 for a LOCK DEVICE FOR A STEERING WHEEL OF AN AUTOMOBILE to Chuan-Chuan Lin concerns a lock device for locking a steering wheel in an automobile that has a retaining plate unit. The retaining plate unit includes an elongated plate body that covers two diametrically opposed portions of a rim of the steering wheel, a first pawl member fixed on the plate body and a second pawl member spaced from the first pawl member and mounted pivotally on the plate body. A blocking rod is mounted movably on the plate body. A locking mechanism includes a key plug unit and a locking rod member which locks the blocking rod releasably on the plate body in combination with the second pawl member so as to extend a portion of the blocking rod from an end portion of the plate body.

This prior art lock device of Lin will also be seen to lack the cooperative interaction of the (three) major members of the present invention. In particular, the present invention will be seen, in having (three) major members all of which telescope relative to each other, to be much more straightforward of installation and operation than is the lock device of Lin which uses a "U"-shaped shackle, or pawl member, that must move perpendicular to other major, sliding, members in order engage a portion of the rim of the steering wheel.

In general, most prior art devices are subject to having their security function defeated by the physical act of cutting or sawing the devices and/or the steering wheel to which the devices are attached. Those few prior art devices—such as those of Chen, et al. and Lin discussed in this section—that are not so susceptible of being defeated tend to be complex and bulky.

It would be useful if a security device could offer some approach other than brute physical strength and resistance to preventing its defeat. After all, the strength of the security device does not generally improve the strength of the steering wheel, thereby always leaving the steering wheel itself as a "weak link" in defeating the security function. One security device that interacts with the steering wheel so as to bolster the security of the combination of (i) wheel and (ii) security device is shown in U.S. Pat. No. 5,353,614 for a VEHICLE STEERING WHEEL LOCK to Anderson. The Anderson lock shrouds all or substantially all of the entire steering wheel in a steel case, and is accordingly very large, heavy and cumbersome—as well as potentially very secure.

It would accordingly be desirable if some security device could exhibit an at least modestly improved resistance to being defeated in its security function by such cutting and sawing activities as may be undertaken against either, or both, the device and/or the steering wheel to which the device is attached.

SUMMARY OF THE INVENTION

The present invention contemplates a vehicular steering wheel security device that locks onto a steering wheel, presenting such an impediment to turning the wheel as deters or effectively precludes theft of the vehicle, simultaneously at each of (i) a location upon the rim of the wheel (normally and preferably where a wheel spoke is present), and (ii) across the diameter of the rim of the wheel. The security function of the device is not subject to being defeated merely by cutting through either the steering wheel, or the device itself, at any single location.

In accomplishing this function the preferred security device has an elegant, and a simple, structure that is correspondingly susceptible both of being readily recognized and lucidly described. Basically, each of three major parts are telescoping relative to each other. Two parts telescope so as to selectively engage the steering wheel at a portion of its rim. The third part independently telescopes relative to the first two parts so as to span a remaining portion of the diameter of the steering wheel, and so as engage the rim of the wheel at a point opposite to the portion where are the first and second parts. One single key lock suffices to lock all telescoping parts in position, selectively engaging or releasing the device from the steering wheel.

Installation is very simple, essentially amounting to a push and pull action both along a single linear axis followed by actuation of the lock. In particular, first and a second telescoping parts are placed over a steering wheel rim at the location of a spoke and slammed together. The third major part is then pulled in telescoping extension from the first two until it engages the steering wheel rim at an opposite point. Finally, a single spring-loaded key lock (located in the second, middle, part) automatically locks the first part to the second part, and both these (locked) parts to the third part. All these steps may transpire very fast and conveniently in but a few seconds time.

In detail of construction, a locking device in accordance with the present invention for use a rimmed steering wheel includes an elongate telescoping assembly having an interior bore. This elongate telescoping assembly includes a first hook sub-assembly—being a first major part of the overall steering wheel locking device—that selectively slides and telescopes relative to a second hook sub-assembly—being the second major part of the overall device. The first and second hook sub-assemblies slide and telescope relative to each other (i) so as to draw close together, first engaging a first portion of the rim of the steering wheel between the first hook sub-assembly and the second hook sub-assembly, or else (ii) so as separate apart, first releasing the first portion of the rim of the steering wheel.

The locking device further includes an elongate hook assembly that selectively slides in the bore of, and telescopes in extension from, the telescoping assembly. This elongate hook assembly so slides either (i) so as to extend from the telescoping assembly (in both of its sub-assemblies), hooking a second portion of the rim of the steering wheel opposite to the first portion and thus second engaging the steering wheel between it first and its second rim portions, or else (ii) so as to draw close to the telescoping assembly, second releasing the steering wheel between its first and its second rim portions.

In accordance with this action the first engaging is separate, and is at a separate location upon the steering wheel rim, than is the second engaging.

The preferred locking device further includes a single lock for simultaneously locking (i) the first hook sub-assembly to the second hook sub-assembly so as to first engage the first portion of the rim of the steering wheel, and (ii) the elongate hook assembly in position extended from the telescoping assembly so as to second engage the steering wheel between it first and its second rim portions.

Notably, either the first, or the second, hook sub-assembly of the telescoping assembly may define the interior bore to the telescoping assembly. It is simply necessary that one of the two sub-assemblies should define this bore, and that the remaining sub-assembly should slide upon the exterior of this sub-assembly.

Preferably, each sub-assembly is (i) tubular with (ii) an extending hook. Preferably it is that sub-assembly which has a hook that hooks the interior of the steering wheel rim (about a first part of the circumference of the first portion of the steering wheel rim) that also defines the bore of the elongate telescoping assembly, and this sub-assembly is arbitrarily called the "first" sub-assembly. The remaining, "second", sub-assembly slides in the bore of its tube upon the exterior surface of the first sub-assembly, with its extending hook hooking the interior of the steering wheel rim about a second part, complimentary to the first part, of the circumference of the first portion of the steering wheel rim. The two sub-assemblies together thus serve to selectively completely encircle and engage, or else to release, the first portion of the rim of the steering wheel.

Notably, (i) the sliding, or telescoping, of the first hook sub-assembly relative to the second hook sub-assembly is co-axial with the (ii) the sliding, or telescoping, of the elongate hook assembly relative to the telescoping assembly. Everything slides, or telescopes, both open, releasing the steering wheel, and shut, engaging the steering wheel, easily and quickly along the same axis, making the device very "user friendly" and easy to use as well as very effective in the security provided.

These and other aspects and attributes of the present invention will become increasingly clear upon reference to the following drawings and accompanying specification.

BRIEF DESCRIPTION OF THE DRAWINGS

FIG. 1 is side plan view showing a preferred embodiment of a vehicle anti-theft device in accordance with the present invention as assembled, the device separately simultaneously locking to the vehicle's steering wheel at each of two locations.

FIG. 2 is a exploded side plan view of the preferred embodiment of the vehicle anti-theft device in accordance with the present invention previously seen in FIG. 1.

DESCRIPTION OF THE PREFERRED EMBODIMENT

Figure 3A:
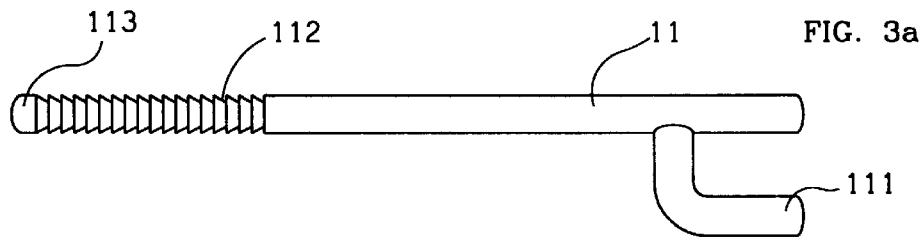
FIG. 3, consisting of FIG. 3a through FIG. 3c, respectively show side, bottom and top plan views of an elongate hook assembly of the preferred embodiment of the vehicle anti-theft device in accordance with the present invention previously seen in FIGS. 1 and 2.

A preferred embodiment of a vehicle anti-theft device 1 in accordance with the present invention is shown partially affixed to a steering wheel 2 (shown in phantom line for not being part of the invention) in FIG. 1. That the device 1 is only partially affixed—the sub-assemblies 121 and 122 of its elongate telescoping assembly 12 not being completely locked together—will become increasingly clear momentarily.

The anti-theft device 1 incorporates three major parts 11, 121 and 122 but what is best understood to be only two major assemblies: an elongate hook assembly 11 and an elongate telescoping assembly 12. The device 1 is typically installed so that its elongate telescoping assembly 12 centers on one of the braces, or spokes (not shown) of the steering wheel 2. The device 1 is further installed so that its elongate telescoping assembly 12 engages, and retains, the rim (shown in cross-section in FIG. 1) of the steering wheel 2 at a position along such rim that is opposite to the point that is engaged by the elongate hook assembly 11.

The three major parts 11, 121 and 122, and the two assemblies 11, 12, may be more completely examined in the exploded side plan view of device 1 shown in FIG. 2.

The elongate telescoping assembly 12 is comprised of a first hook sub-assembly 121 and a second hook sub-assembly 122. Each of these sub-assemblies 121, 122 is in part tubular, and defines an interior bore. However, only one of the sub-assemblies is considered to define the overall interior bore to the entire telescoping assembly 12. In the illustrated embodiment it is the sub-assembly 121—called the "first" sub-assembly—that so defines the overall interior bore 1211 to the entire telescoping assembly 12. The remaining, second, sub-assembly 1221 also defines a bore 1221, and with this bore it slides upon the exterior surface 1212 of the first sub-assembly 121. Each of the sub-assemblies 121, 122 is thus clearly tubular, at least in part.

Each of the sub-assemblies 121, 122 also mounts at least one extending hook. The first sub-assembly 121 preferably has two hooks 1213, 1214 as are most clearly seen in FIGS. 4b and 4c. The second sub-assembly 122 preferably has but one hook 1222, as may be seen in FIG. 5 as well as FIGS. 1 and 2. The preferred three hooks 1213, 1214, 1222 opposed between the two sub-assemblies 121, 122 particularly serve to hook the steering wheel rim of the steering wheel 2 (shown in phantom line in FIG. 1), normally at a location about a spoke (not shown).

The first hook sub-assembly 121 slides relative to the second hook sub-assembly 122, and vice versa. The first and second hook sub-assemblies 121, 122 may so slide relative to each other (i) so as to draw close together, engaging a portion of the rim of the steering wheel 2 between the first hook sub-assembly 121 and the second hook sub-assembly 122, or else (ii) so as separate apart, first releasing this portion of the rim of the steering wheel 2.

In particular, the second sub-assembly 122 slides in its circular bore 1221 upon the tubular exterior surface 1212 of the first sub-assembly 121, with its extending hook 1222 hooking a part of the (exterior of) the rim of the steering wheel 2. Equivalently, the first sub-assembly 121 slides within the bore 1221 of the second sub-assembly 121, with its extending hooks 1213, 1214 hooking a part of the (interior of) the rim of the steering wheel 2 that is complimentary to the part that is hooked by the hook 122 of the second sub-assembly 122. The two sub-assemblies 121, 122 together thus serve to selectively engage, and to release, the first portion of the rim of the steering wheel 2. An end cap 14 fitted to the end of the first hook sub-assembly 121 serves to prevent that the second hook sub-assembly 122 should slide off the end of the first hook sub-assembly 121.

The locking device 1 further includes an elongate hook assembly 11. The elongate hook assembly 11 selectively slides in the major bore 1211 of the telescoping assembly 12, and of its first sub-assembly 121. It so slides either (i) so as to extend from the telescoping assembly 12 (in both of its sub-assemblies 121, 122), hooking a portion of the rim of the steering wheel 2 opposite to the portion hooked by the telescoping assembly 12, or else (ii) so as to draw close to the telescoping assembly 12, releasing the steering wheel 2 between its opposed rim portions. The elongate hook assembly 11 and the telescoping assembly 12 jointly thus operate either so as to engage, or to release, the steering wheel 2 between its opposed rim portions.

Notably to the invention, the engaging of a first rim portion of the steering wheel 2 by the telescoping assembly 12 is separate, and is between different positions upon the steering wheel rim, than is the engaging of the steering wheel 2 by action of the telescoping assembly 12 and the elongate hook assembly 11.

The preferred locking device 1 also includes a single lock 13, typically a key lock, that fits to the first sub-assembly 121 of the telescoping assembly 12. The lock 13 serves to simultaneously lock (i) the first sub-assembly 121 to the second hook sub-assembly 122, and (ii) the elongate hook assembly 11 to the telescoping assembly 12. In particular, the second sub-assembly 122 has and presents an extension 1223 that defines at its distal end a number of notches 12231, as is most clearly visible in FIG. 5b. Meanwhile, the elongate hook assembly 11 has and defines concentric grooves 112 along the length of its distal end, as is most clearly visible in FIGS. 2 and 3.

Figure 6:
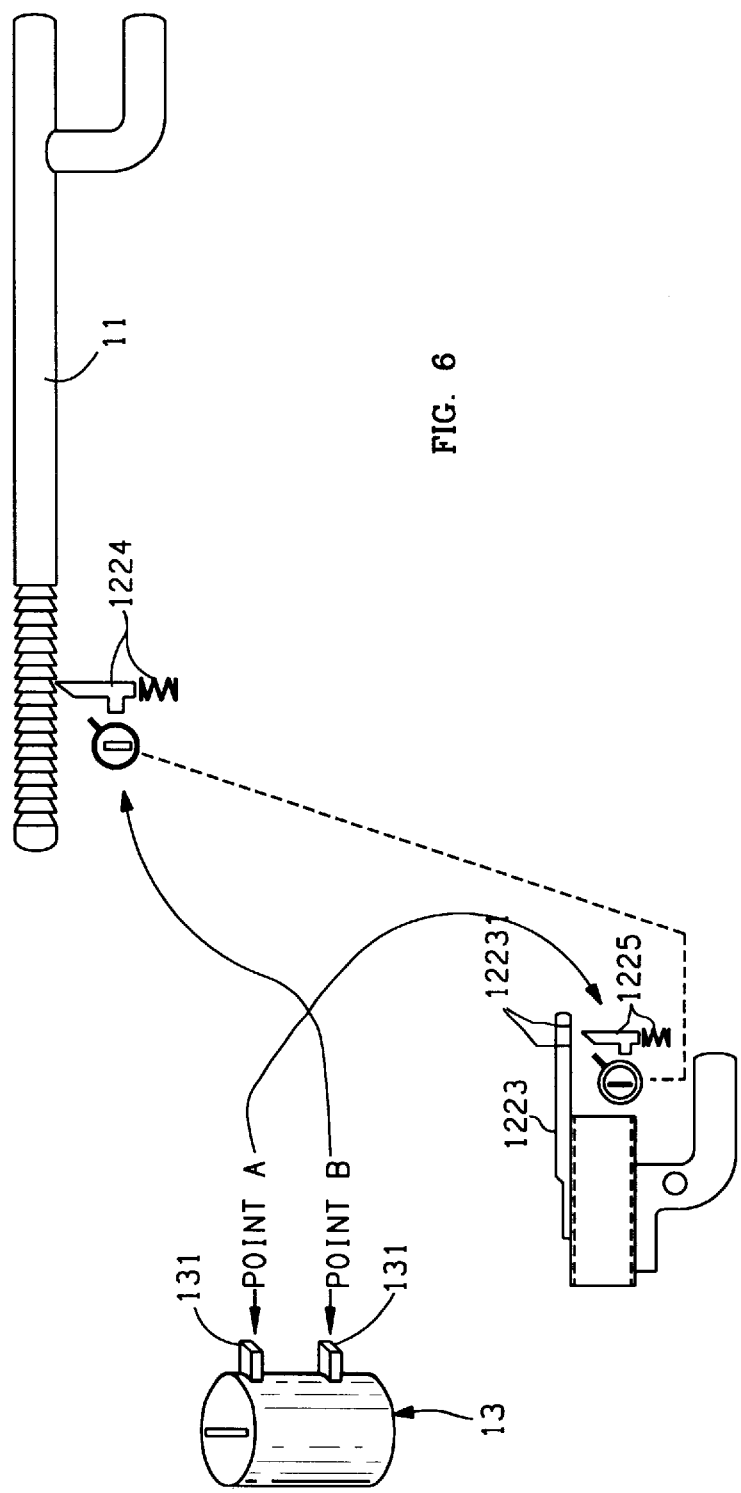

The lock 13 as is most clearly visible in FIG. 6 has a simple camming mechanism 131 (shown in FIG. 6) of a type well known in the art. This camming mechanism 131 serves to simultaneously selectively engage (i) an upper spring-loaded pin 1224, and (ii) a lower spring-loaded pin 1225, both within second sub-assembly 122. The upper spring-loaded pin 1224 engages the notch 12231 of the extension 1223 of the sub-assembly 122 at Point B, and the lower spring-loaded pin 1225 engages one of the grooves 112 of the elongate hook assembly 11 at Point A, all as is diagrammatically represented in FIG. 6. Clearly everything is locked relative to the (centrally-located) first sub-assembly 121, and relative to each other.

The key lock 13 operates in a conventional matter by use of a key (not shown) to release the camming mechanism 131 from holding depressed the upper and lower spring-loaded pins 1124, 1225, releasing these pins to retract under spring force. Retraction of the spring-loaded pins 1124, 1125 releases the second sub-assembly 122 from the first sub-assembly 121, and also the entire telescoping assembly 12 from the elongate hook assembly 11. By a manual sliding movement of these sub-assemblies and assemblies the locking device 1 may be easily removed from the steering wheel 2 (shown in FIG. 1) at both of its opposed rim portions, and withdrawn for easy storage.

Figure 3B:
Figure 3C:
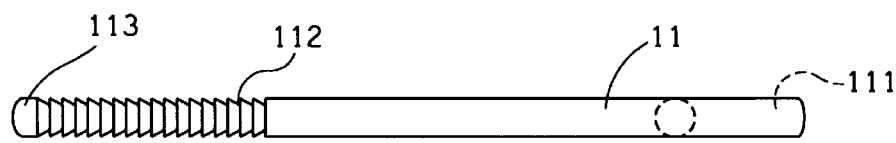

Respective top, side, and bottom detail plan views of the elongate hook assembly 11 of the anti-theft device 1 of the present invention are respectively shown in FIGS. 3a–3b. The hook 111 and a number of concentric grooves 112 that are engaged by the lock 13 are visible. A bulbous end 113 may optionally be presented, and may be interactive with a complimentary constricted region of the interior bore 1211 of the first sub-assembly 121 at the region of the lock 13, in order to prevent the rare occurrence that the elongate hook assembly 11 should be extended so excessively far from the telescoping assembly 12 so as to otherwise become separated therefrom.

Figure 4A:
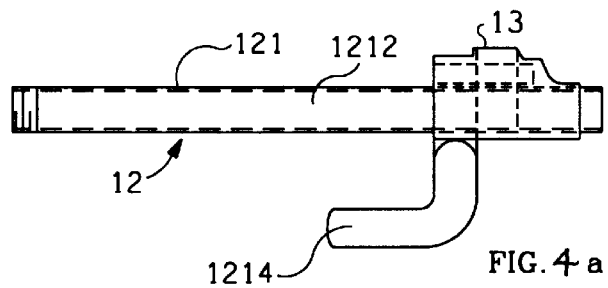
FIG. 4, consisting of FIG. 4a through FIG. 4c, respectively show side, bottom and top plan views of a first hook sub-assembly, part of an elongate telescoping assembly, of the preferred embodiment of the vehicle anti-theft device in accordance with the present invention previously seen in FIGS. 1 and 2.
Figure 4B:
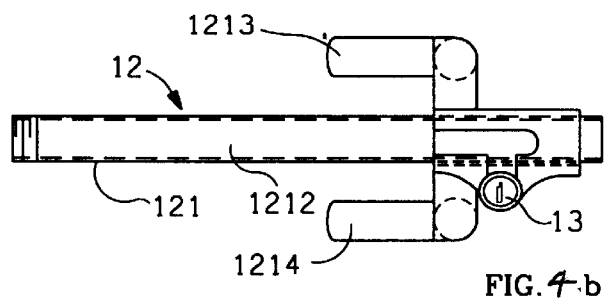
Figure 4C:
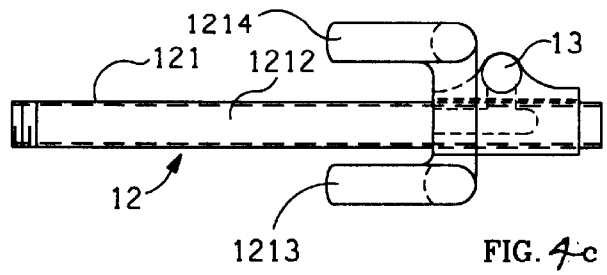

Respective top, side, and bottom detail plan views of the first sub-assembly 121 of the telescoping assembly 12 of the anti-theft device 1 of the present invention are respectively shown in FIGS. 4a–4b. The hooks 1213, 1214 and the lock 13 are visible. An end region opposite to the hooks 1213, 1214 is preferably threaded to accept the end cap 14.

Figure 5A:
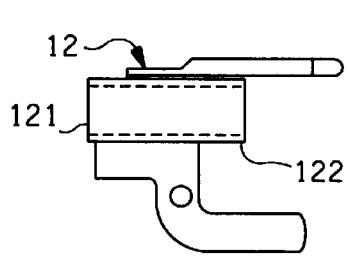
FIG. 5, consisting of FIG. 5a through FIG. 5c, respectively show side, bottom and top plan views of a second hook sub-assembly, also part of an elongate telescoping assembly, of the preferred embodiment of the vehicle anti-theft device in accordance with the present invention previously seen in FIGS. 1 and 2.
Figure 5B:
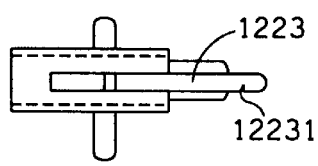
Figure 5C:
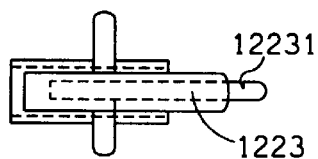

Finally, respective top, side, and bottom detail plan views of the second sub-assembly 122 of the telescoping assembly 12 of the anti-theft device 1 of the present invention are respectively shown in FIGS. 5a–5b. The hook 1222 as well as an extension 1223 that is engaged by the lock 13 (shown in FIGS. 2 and 4) are visible.

The vehicle anti-theft device 1 operates in a substantially conventional manner for a steering wheel lock. Namely, when the device 1 is affixed by locking (in two places) to the steering wheel 2 (shown in FIG. 1), then the elongate extension of the telescoping assembly 12, particularly in the element of its first sub-assembly 121, extends well beyond the rim of the steering wheel 2, and precludes, by contact with other parts of a vehicle in which the steering wheel 2 is present, a full and free rotation of the steering wheel 2, and the necessary and adequate steering of the vehicle.

Most portions of all members of the anti-theft security device 1 are circular in cross-section, as is substantially indicated in the drawings. All elements are preferably constructed of appropriately hardened steels. It should be noted, in particular, that the double hooks 1213, 1214 of the first sub-assembly 121 of the telescoping assembly 12 serve to surround, and protect, both the single hook 122 of the second sub-assembly 122 of the telescoping assembly 12, and also any rim and spoke potion of the steering wheel 2 about which the telescoping assembly 12 is affixed.

This protection, and the structure shown, makes it very difficult to dislodge, in particular, the telescoping assembly 12 from the steering wheel 2 without the proper use of the key. Therefore, and by this construction, the most common point of vulnerability of prior art steering wheel lock and mechanisms—either the steering wheel rim or the elongate extension of the steering wheel lock itself—is substantially avoided by the device 1 of the present invention.

When the anti-theft device 1 of the present invention is correctly mounted, its function to prevent the easy turning of the steering wheel 2 cannot be defeated merely by cutting or sawing the steering wheel 2 at a single location. For example, severing the steering wheel along any of the dashed lines A—A, B—B, C—C, or D—D may suffice to remove one of the assemblies 11, 12—normally elongate hook assembly 11—but will not suffice to remove the remaining locking mechanism—normally the telescoping assembly 12.

Likewise, sawing the anti-theft device 1 itself, normally in the region of the hook 1222 of the sub-assembly 122 of the telescoping assembly 12, will not suffice to completely dislodge the device 1 from the steering wheel 2. Namely, and although the sub-assembly 122 of the telescoping assembly 12 may be dislodged, the elongate hook assembly 11 continues to affix the steering wheel 2 between itself and remaining portions of telescoping assembly 12. Generally, however, it is the telescoping assembly 12 that is the harder to defeat because it substantially surrounds, and strongly protects, a spoke and a portion of the rim 22 the steering wheel 2 to which it is affixed.

According to these provisions and this operation, the anti-theft device 1 in accordance with the present invention is generally more securely attached, and harder to defeat in its security function, than is a standard steering wheel lock of the prior art.

In accordance with the preceding explanation, variations and adaptations of a steering wheel anti-theft security device in accordance with the present invention will suggest themselves to a practitioner of the mechanical design arts.

In accordance with these possible variations and adaptations of the present invention, the scope of the invention should be determined in accordance with the following claims, only, and not solely in accordance with that embodiment within which the invention has been taught.

What is claimed is:

1. A locking device adapted for a steering wheel having a rim, the device comprising:
    a first assembly, having a first-assembly elongate body defining an axis and an axial bore and further having
        a first hook and a second hook mounted to the first elongate body facing each other, the first hook selectively sliding relative to the second hook along the axis either
            so as to draw the hooks close together so as to first-engage a first portion of the rim of the steering wheel between the first hook and the second hook, or else
            so as separate the hooks apart so as to first-release the first portion of the rim of the steering wheel; and
    a second assembly having a second-assembly elongate body to which is mounted a third hook, the second-assembly elongate body selectively telescoping along the axis and within the bore of the first-assembly elongate body either
        so as to extend from the first-assembly elongate body for hooking with the third hook a second portion of the rim of the steering wheel opposite to the first portion and thus second-engaging the steering wheel between the first and the second rim portions, or else
        so as to draw close to the first assembly elongate body for second-releasing of the steering wheel between the first and the second rim portions;
    wherein the first-engaging and the first-releasing are each separate, and are separately performed upon the steering wheel rim, than is the second-engaging and the second-releasing; and
    wherein the first-engaging and the first-releasing by sliding, and the second-engaging and the second-releasing by telescoping, are all along the same axis.

2. The locking device according to claim 1 further comprising:
    a lock for simultaneously locking (i) the first hook to the second hook in an engaging position for first-engaging the first portion of the rim of the steering wheel, and (ii) the second assembly extended from the first assembly in an engaging position for engaging the steering wheel between the first and the second rim portions.

3. The locking device according to claim 1 wherein the first hook comprises:
    an elongate tubular first member having an extending first hooked protuberance for hooking an interior side of the steering wheel rim about a first portion of its circumference, a tube of this tubular first member defining the bore of the first assembly;
    and wherein the second hook comprises:
    a tubular second member, having an extending second hooked protuberance for hooking an exterior side of the steering wheel rim about the first portion of its circumference, sliding in a bore of its tube upon the exterior of the elongate tubular first member so as to selectively first-engage, and first-release, the first portion of the rim of the steering wheel.

4. A locking device adapted for a steering wheel having a circular rim, a hub at a center of the circular rim, and a plurality of spokes extending radially from the hub to connect with the circular rim, the locking device comprising:
    a first tubular member, having (i) a first tube defining an axis and an axial bore with (ii) a first hook extending externally from the first tube in a first direction, for hooking from an interior side of the steering wheel rim a first arcuate portion of the steering wheel rim;
    a second tubular member, having (i) a second tube fitting the first tube and (ii) a second hook extending externally from the second tube oppositely to the first direction, for selectively axially sliding along the first tube until the second hook selectively captures the first arcuate portion of the steering wheel rim in position between itself and the first hook; and
    an elongate member, having (i) and elongate shaft fitting within the axial bore of the first tube and (ii) a third hook extending in the first direction, for axially telescoping within the axial bore of the first tube so as to selectively extend therefrom, selectively hooking a second arcuate portion of the rim of the steering wheel; and a lock means for locking the first tubular member and the second tubular member in position capturing the first arcuate portion of the steering wheel rim, and for locking the elongate member in position extended from the first tubular member so as hook the second arcuate portion of the steering wheel rim, thus to lock the device to the steering wheel at each of the first and the second arcuate portions; and wherein both the sliding and the telescoping are axial along the same axis.

5. The locking device according to claim 4 wherein the first hook comprises:

two hooked protuberances extending in the first direction and suitably separated so as to span to either side of a spoke of the steering wheel from positions interior of the steering wheel rim at the location of the spoke;

wherein the second hook captures the first arcuate portion of the steering wheel rim in and about the position of the spoke in position between itself and the two extending protuberances of the first tubular member.

6. A method of mounting a steering wheel security device comprising:

placing first and second telescoping parts over an arcuate rim portion of steering wheel;

telescoping together along an axis the first and second telescoping parts until they capture the first arcuate rim portion of the steering wheel between them;

extending along the axis a third telescoping part from the first and the second telescoping parts, jointly, until this third telescoping part engages the steering wheel rim at a second arcuate rim portion opposite the first arcuate rim portion; and locking with a lock (i) the first telescoping part to the second telescoping part so that they capture the first arcuate rim portion of the steering wheel between them, and also (ii) the third telescoping part in extension from the first and the second telescoping parts, jointly, so that the third telescoping part engages the steering wheel rim at the second arcuate rim portion;

wherein all the telescoping is along the one axis.

* * * * *